United States Patent
Guhl et al.

(10) Patent No.: US 11,292,914 B2
(45) Date of Patent: Apr. 5, 2022

(54) COMPOSITIONS AND METHODS AND USES RELATING THERETO

(71) Applicant: Keeling & Walker, Limited, Stoke-on-Trent (GB)

(72) Inventors: Dieter Guhl, Stoke-on-Trent (GB); Anna Dobrowolska, Stoke-on-Trent (GB)

(73) Assignee: Keeling & Walker, Limited, Stoke-on-Trent (GB)

( * ) Notice: Subject to any disclaimer, the term of this patent is extended or adjusted under 35 U.S.C. 154(b) by 274 days.

(21) Appl. No.: 16/574,337

(22) Filed: Sep. 18, 2019

(65) Prior Publication Data
US 2020/0095426 A1 Mar. 26, 2020

(30) Foreign Application Priority Data
Sep. 21, 2018 (GB) ..................... 1815402

(51) Int. Cl.
*C09B 69/00* (2006.01)
*C09D 7/41* (2018.01)
(Continued)

(52) U.S. Cl.
CPC ............ *C09B 69/007* (2013.01); *C08J 5/18* (2013.01); *C08K 3/22* (2013.01); *C08K 5/523* (2013.01); *C08K 5/524* (2013.01); *C08K 5/5333* (2013.01); *C09D 5/32* (2013.01); *C09D 7/41* (2018.01); *C09D 11/037* (2013.01); *E06B 9/24* (2013.01);
(Continued)

(58) Field of Classification Search
CPC ........ B41M 3/144; B41M 5/26; B41M 5/267; C01G 41/02; C03C 17/32; C04B 35/495; C04B 2235/3201; C04B 2235/3284; C04B 2235/3293; C07F 11/005; C07F 19/00; C08J 5/18; C08J 2369/00; C08K 3/22; C08K 5/523; C08K 5/524; C08K 5/5313; C08K 5/5333; C08K 2003/2258; C09B 69/007; C09D 5/32; C09D 7/41; C09D 11/037; C09K 3/00; C09K 11/0805; C09K 11/701; C09K 11/71; E06B 9/24; E06B 2009/2417
See application file for complete search history.

(56) References Cited

U.S. PATENT DOCUMENTS
8,083,847 B2   12/2011  Takeda et al.
8,268,202 B2    9/2012  Mamak et al.
(Continued)

FOREIGN PATENT DOCUMENTS
EP    3409723 A1     10/2016
JP    2008208274 A    9/2008
(Continued)

OTHER PUBLICATIONS

Great Britain Search Report for Application No. GB1815402.1, dated Mar. 20, 2019, 2 pages.

*Primary Examiner* — Sathavaram I Reddy
(74) *Attorney, Agent, or Firm* — Hoffman Warnick, LLC

(57) ABSTRACT

A material of formula (I)

$$M^1_a M^2_b W_c O_d (P(O)_n R_m)_e \qquad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

14 Claims, 7 Drawing Sheets

C

B

A

(51) Int. Cl.
*C08J 5/18* (2006.01)
*C08K 3/22* (2006.01)
*C08K 5/523* (2006.01)
*C08K 5/524* (2006.01)
*C08K 5/5333* (2006.01)
*C09D 5/32* (2006.01)
*C09D 11/037* (2014.01)
*E06B 9/24* (2006.01)

(52) U.S. Cl.
CPC ... *C08J 2369/00* (2013.01); *C08K 2003/2258* (2013.01); *E06B 2009/2417* (2013.01)

(56) References Cited

U.S. PATENT DOCUMENTS

| | | | |
|---|---|---|---|
| 11,059,316 B2* | 7/2021 | Guhl | B42D 25/382 |
| 2010/0129630 A1 | 5/2010 | Fujita | |
| 2011/0248225 A1 | 10/2011 | Mamak et al. | |
| 2012/0129090 A1 | 5/2012 | Mamak et al. | |

FOREIGN PATENT DOCUMENTS

| | | |
|---|---|---|
| JP | 2017095686 A | 6/2017 |
| WO | 2017217459 A1 | 12/2017 |

* cited by examiner

COMPOSITIONS AND METHODS AND USES RELATING THERETO

CROSS-REFERENCE TO RELATED APPLICATIONS

This application claims the benefit of co-pending GB Patent Application Serial No. 1815402.1, filed 21 Sep. 2018, which is hereby incorporated herein as though fully set forth.

Near Infrared (NIR) absorbing materials have recently gained significant technical importance. In hot climates in particular temperature control inside buildings or vehicles represents a major part of the energy expenditure. There is a constant challenge to lower energy consumption and costs associated with air conditioning, thermal insulation and related materials.

Most heat from the sun is transported by the NIR part of the solar light spectrum. One means used to reduce the heat transfer into buildings and vehicles, for example, is modification of the exposed surfaces such that the NIR part of the solar light spectrum is either reflected or absorbed, but not transmitted. In the case of a window it is desirable that the visible part of the spectrum can transmit through it, but the NIR part should be reflected or absorbed. As a result the heat transfer into the space behind the window is greatly reduced.

Many inorganic materials have been used for absorption of NIR radiation in recent years. Inorganic compounds are generally favoured because their degradation in light is usually lower than that of organic compounds.

Mainly metallic compounds are currently used for manufacturing of NIR absorbing materials. Key representatives of these compounds include:

Antimony doped tin oxide (ATO);
Indium tin oxide (ITO);
Lanthanum hexaboride (LaB6);
Caesium tungsten oxide (CWO);
Molybdenum oxide (MoO);
Silver metal particles (Ag); and
Mixtures thereof.

There are numerous derivatives of these key substance classes being commercially used.

Typically it is necessary to incorporate particles of the NIR absorbing materials into coatings or polymeric films, which are used to cover the exposed surfaces of buildings against sunlight. In order to allow the visible part of the spectrum to transmit through the films, the particle size of the absorbers needs to be reduced into the nanoscale, typically below 100 nm, to provide a visually transparent coating. Particle size reduction is usually done by milling micrometer sized particles by high energy milling down to the required nanoscale.

The direct synthesis of nanoparticles is possible via hydrothermal or solvothermal processes and methods of the prior art are known to be successful on a laboratory scale. However on scale up there have been a number of issues with the hydrothermal and solvothermal processes, for example low efficiencies, difficulties removing by-products and high costs of the required equipment.

Different materials have different NIR absorption properties. These differences can be measured by optical spectroscopy. The powder reflectance spectra or the transmittance spectra can be measured and the absorption against the solar spectrum is observed. There are several ways to calculate the absorption efficiencies of the individual materials.

Preferred substances are those which show only little absorption in the visual range of the spectrum (e.g. between 400 to 800 nm) and high absorption in the NIR range (800 to 2500 nm). Preferred materials have steep and narrow changes of absorption properties.

Antimony doped tin oxide (ATO) thin films, for example, have a high transparency in the visual range, but the highest absorption occurs from 1200 nm onwards to higher wavelength. Indium tin oxide (ITO) thin films show higher absorption rates than ATO but generally has a similar slope. The maximum absorption of ITO thin films occurs from 1100 nm onwards.

ATO and ITO based materials show a high absorption in the longer wavelength, especially above 1500 nm, although this is a part of the solar spectrum which carries a smaller part of the heat load.

Lanthanum hexaboride (LaB6) and caesium tungsten oxide (CWO) are more efficient in the NIR range. Their absorption maximum in the NIR range starts from 950 nm onwards. The absorption decreases again above 1400 nm. This is one of the main differences between these compounds and materials based on ATO and ITO.

However it is well known to those skilled in the art that LaB6 and CWO become unstable when their particle size is reduced to the nanoscales necessary to create transparent films or coatings. While LaB6 is sensitive to moisture, the degradation of CWO is related to oxidation.

The NIR absorbing properties of CWO are due to a number of factors, including the crystal structure of the $WO_3$ matrix (only the hexagonal, cubic and triclinic forms give rise to IR absorptive materials); the ratio of $W^{5+}$ and $W^{6+}$ oxidation states; and the presence of trace metals.

If CWO is oxidized, the crystal structure does not necessarily change, but the amount of $W^{5+}$ is greatly reduced, which may lead to a loss of NIR absorption capability.

In view of this several attempts have been made to overcome the instability of CWO either by changing the synthetic route, changing the composition or combining with UV absorbing materials such as zinc oxide or organic UV absorbers based on substituted hydrochinons, cinnamides or phosphorus. Such combinations are typically physical mixtures in coating or polymer formulations.

There are several industrially viable ways to make CWO and materials based thereon.

One method involves a classical solid state synthesis starting from solid caesium sources, for example caesium carbonate or caesium hydroxide and a tungsten oxide source, for example tungstic acid, ammonium tungstate or sodium tungstate. The raw materials are mixed and heated typically under a reducing atmosphere of forming gas or other inert/hydrogen gas combinations at high temperatures up to 800° C. The result is a coarse dark-blue powder of the typical formula $C_{s_{0.32}}WO_3$. The reduction in particle size is achieved by processing the powder in a bead mill for prolonged time to achieve nanoscale particle size.

An alternative method uses solvent based precipitation processes starting from tungsten hexachloride and caesium chloride. These materials are dissolved in ethanol, dried and then reduced by a hydrogen containing gas mixture at elevated temperature. The resulting coarse particles are again reduced to nanoscale by bead milling.

Direct synthesis of nanoparticles involves hydro- or solvothermal processes. These start from similar tungsten and caesium sources and an additional chemical reduction agent. The mixed raw material are dissolved in a liquid phase and then heated over a prolonged time to temperatures between 150 to 320° C. to form directly nanoparticulate CWO dispersions. Typically separation of the by-products from the nanoscale CWO dispersion is difficult. However, the advantage is that the particle size distribution and particle form can be influenced more easily than with solid state processes.

No matter which synthetic approach is chosen, sensitivity to oxidation is not overcome. A problem is potential incompatibility with other components in the intended final product. In most processes the final product is a liquid dispersion which is included into a paint, coating or an ink. As the polymeric coatings and inks are all liquid, the incorporation of the nanoscale CWO dispersion is not a problem as long as any issues with incompatibilities of solvents and dispersing aids can be avoided. However if the CWO should be incorporated into polymers, for example in form of a masterbatch or a compound, then solid products are preferred. The introduction of liquid material is technically not easy, as the solvent or water has to be removed from the polymer melt. In polymers containing ester groups for example this can lead to a degradation of the polymer. This is the case for examples for polycarbonate, polyethyleneterephthalate or polybutylenterephthalate and similar polymers.

Converting CWO dispersions into a solid state is technically not a problem, but the nanoparticles reagglomerate in solid state. If dry CWO powders are included into a polymer melt there is usually incomplete deagglomeration and this limits the efficiency of the NIR absorption in the polymer and compromises the transparency of the polymeric film or extrudate. Similar effects are seen if solid CWO particles are incorporated into liquid formulations such as inks and coatings. The efficiency is typically lower because of poor distribution of the agglomerated particles in the matrix. Until now, dispersions have been considered to be the best option. However these require the user to work with large amounts of solvents. This is not very desirable as the preferred solvents are typically flammable and involve the shipping and handling of large amounts of solvent carrying only a limited amount of NIR absorbing material.

It would therefore be highly desirable to provide NIR absorbing materials based on tungsten oxide, which are not susceptible to UV degradation, disperse well in polymers, coatings and inks without further treatment and avoid the handling of solvents.

It is an aim of the present invention to provide a NIR absorbing material which overcomes at least one disadvantage of the prior art.

According to a first aspect of the present invention there is provided a material of formula (I)

$$M^1_a M^2_b W_c O_d (P(O)_n R_m)_e \tag{I}$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

Each of $M^1$ and $M^2$ is suitably present as a cationic species. Each of $M^1$ and $M^2$ is selected from ammonium or a metal cation.

$M^1$ is preferably a metal cation selected from the group consisting of alkali metals, alkaline earth metals, group 13 metals, group 14 metals and first or second row d-block metals.

Preferably $M^1$ is selected from ammonium, alkali metals, zinc and tin. More preferably $M^1$ is selected from ammonium, potassium, sodium, caesium, rubidium, zinc and tin. Most preferably $M^1$ is an alkali metal, especially caesium.

$M^2$ is preferably a metal cation selected from the group consisting of alkali metals, alkaline earth metals, group 13 metals, group 14 metals and first or second row d-block metals.

Preferably $M^2$ is selected from alkali metals, alkaline earth metals, zinc and tin. More preferably $M^2$ is selected from alkali metals, zinc and tin. Most preferably $M^2$ is selected from sodium, potassium, zinc and tin.

$M^2$ may comprise a mixture of two or more metals.
Preferably $M^1$ is caesium and $M^2$ is not caesium.
Preferably $M^1$ is caesium and $M^2$ is selected from the group consisting of alkali metals, zinc and tin.
In one embodiment $M^1$ is caesium and $M^2$ is sodium.
In one embodiment $M^1$ is caesium and $M^2$ is zinc.
In one embodiment $M^1$ is caesium and $M^2$ is tin.
In one especially preferred embodiment $M^1$ is caesium and $M^2$ is potassium.

a is from 0.01 to 0.5. Preferably a is from 0.1 to 0.45. Most preferably a is from 0.22 to 0.4.

b is from 0 to 0.5. Preferably b is from 0.001 to 0.4, or from 0.005 to 0.3. Suitably from 0.0075 to 0.25, for example from 0.01 to 0.2.

The sum of a and b is preferably from 0.1 to 0.6, preferably from 0.2 to 0.4, more preferably from 0.3 to 0.35.

d is from 2.5 to 3. Preferably d is from 2.6 to 3. Most preferably d is from 2.7 to 3.

e is 0.01 to 0.75.

Preferably e is from 0.01 to 5, more preferably from 0.02 to 0.4, suitably from 0.03 to 0.4, for example from 0.05 to 0.25.

In one preferred embodiment e is from 0.06 to 0.1.

n may be 1, 2 or 3.

Preferably n is 2 or 3. Most preferably n is 3.

m may be 1, 2 or 3.

Preferably m is 1 or 2. Most preferably m is 1.

When m is more than 1 each R may be the same or different. References herein to R apply independently to each R in such embodiments. However in preferred embodiments each R is the same.

R is an optionally substituted hydrocarbyl group.

Preferably R is an optionally substituted alkyl, alkenyl, aryl, aralkyl, alkaryl group or an alkoxy containing group.

Preferably R is an unsubstituted alkyl, alkenyl, aryl, aralkyl or alkaryl group or an alkoxy containing group.

Preferably R is selected from alkyl groups, aryl groups, aralkyl groups and alkoxy or phenoxy containing groups.

Suitable alkoxy containing groups include alkoxylated alkyl groups, polyalkoxylated alkyl groups, alkoxylated alcohols and polyalkoxylated alcohols.

Preferred alkoxy containing groups are polyalkoxylated alcohols especially moieties derived from ethylene oxide and/or propylene oxide. Especially preferred alkoxy containing groups are polyethylene glycol (PEG) or polypropylene glycol (PPG) groups having a number average molecular weight from 50 to 2500, more preferably from 50 to 1000, most preferably from 50 to 400.

In some embodiments R is an aryl group. Suitable aryl groups may comprise one or more aromatic rings. In some embodiments R may be naphthyl.

Suitable aryl groups include heterocyclic aryl groups. Preferred aryl groups have 5 to 7 carbon atoms and optionally contain one or more heteroatoms for example N, S or O.

Preferred aryl groups are phenyl and substituted phenyl groups.

In some embodiments R may be OAr where Ar is an aryl group. For example R may be phenoxy.

Suitable substituents include one or more alkyl and/or alkoxy containing groups.

Preferred substituents include methyl, ethyl, propyl, butyl, pentyl, hexyl, heptyl, octyl, nonayl, and isomers thereof; derivatives of poly(isoprene) and poly(isobutylene)

and polyalkoxylated alcohols especially moieties derived from ethylene oxide and/or propylene oxide. Some preferred substituents when R is phenyl are isohexyl, isoheptyl and isononyl.

In some embodiments R may be toluol or xylol.

In some embodiments R is an unsubstituted aryl group. In one preferred embodiment R is phenyl.

In some embodiments R is an optionally substituted alkyl group.

Suitable substituents include halo, hydroxy, nitro, amino and alkoxy.

Preferred alkyl groups are unsubstituted.

Suitably R is an unsubstituted linear or branched alkyl group.

Suitably R is selected from an alkoxy group, a phenoxy group or an alkyl or aryl group having 1 to 36 carbon atoms.

Preferably R is an alkyl or aryl group having 1 to 36 carbon atoms, preferably 2 to 30 carbon atoms, more preferably 4 to 24 carbon atoms, suitably 6 to 20 carbon atoms.

In some embodiments R is an unsubstituted alkyl or aryl group having 4 to 24 carbon atoms.

In some embodiments R is an unsubstituted alkyl group having 8 to 18 carbon atoms.

In one preferred embodiment R is $C_8H_{17}$.

In one preferred embodiment R is $C_{18}H_{37}$.

Most preferably R is selected from octyl, octadecyl and phenyl.

Phosphorus may be present in a +3 or +5 oxidation state. Most preferably phosphorus is present in a +5 oxidation state.

Preferably $M^1$ is caesium; $M^2$ is selected from alkali metals, tin or zinc; a is 0.1 to 0.45; b is 0 to 0.3; c is 1; d is 2.7 to 3; e is 0.01 to 0.4; n is 2 or 3; m is 1 or 2 and each R is an unsubstituted alkyl or aryl group or an alkoxy group having 1 to 30 carbon atoms.

In some preferred embodiments, $M^1$ is caesium; $M^2$ is selected from sodium, potassium, tin or zinc; a is 0.22 to 0.4; b is 0.01 to 0.2; c is 1; d is 2.7 to 3; e is 0.05 to 0.25; n is 2; m is 1 and R is an unsubstituted alkyl or aryl group having 6 to 20 carbon atoms.

In one preferred embodiment, $M^1$ is caesium; $M^2$ is potassium; a is 0.32; b is 0.01; c is 1; d is 2.9; e is 0.08; n is 2; m is 1 and R is $C_8H_{17}$. Thus the material of formula (I) may be $C_{s_{0.32}}K_{0.01}WO_{2.9}(P(O_2)C_8H_{17})_{0.08}$.

In one embodiment, $M^1$ is caesium; $M^2$ is potassium; a is 0.32; b is 0.01; c is 1; d is 2.9; e is 0.16; n is 2; m is 1 and R is phenyl. Thus the material of formula (I) may be $C_{s_{0.32}}K_{0.01}WO_{2.9}(P(O_2)C_6H_5)_{0.16}$.

In one embodiment, $M^1$ is caesium; $M^2$ is potassium; a is 0.27; b is 0.05; c is 1; d is 2.9; e is 0.2; n is 2; m is 1 and R is $C_{18}H_{37}$. Thus the material of formula (I) may be $C_{s_{0.27}}K_{0.05}WO_{2.9}(P(O_2)C_{18}H_{37})_{0.2}$.

In one embodiment, $M^1$ is caesium; $M^2$ is sodium; a is 0.32; b is 0.01; c is 1; d is 3; e is 0.2; n is 2; m is 1 and R is $C_{18}H_{37}$. Thus the material of formula (I) may be $C_{s_{0.32}}Na_{0.01}WO_3(P(O_2)C_{18}H_{37})_{0.2}$.

In one embodiment, $M^1$ is caesium; $M^2$ is tin; a is 0.22; b is 0.1; c is 1; d is 2.9; e is 0.16; n is 2; m is 1 and R is $C_{18}H_{37}$. Thus the material of formula (I) may be $C_{s_{0.22}}Sn_{0.1}WO_{2.9}(P(O_2)C_{18}H_{37})_{0.16}$.

In one embodiment, $M^1$ is caesium; $M^2$ is zinc; a is 0.12; b is 0.2; c is 1; d is 3; e is 0.16; n is 2; m is 1 and R is phenyl. Thus the material of formula (I) may be $C_{s_{0.12}}Zn_{0.2}WO_3(P(O_2)C_6H_5)_{0.16}$.

In some embodiments, b is 0 such that the material of formula (I) does not comprise $M^2$. In such embodiments $M^1$ is caesium, a is 0.22 to 0.4; b is 0; c is 1; d is 2.7 to 3; e is 0.05 to 0.25; n is 2; m is 1 and R is an unsubstituted alkyl or aryl group having 6 to 20 carbon atoms.

In one embodiment, $M^1$ is caesium; a is 0.32; b is 0; c is 1; d is 2.72; e is 0.08; n is 2; m is 1 and R is $C_{18}H_{37}$. Thus the material of formula (I) may be $C_{s_{0.32}}WO_{2.72}(P(O_2)C_8H_{17})_{0.08}$.

In one embodiment, $M^1$ is caesium; a is 0.31; b is 0; c is 1; d is 2.9; e is 0.16; n is 2; m is 1 and R is phenyl. Thus the material of formula (I) may be $C_{s_{0.31}}WO_{2.9}(P(O_2)C_6H_5)_{0.16}$.

The present invention relates to a tungsten oxide based material. In preferred embodiments the material includes an organophosphorus moiety of formula W—O—P—OR or W—O—P—R.

By a moiety of formula W—O—P—OR or W—O—P—R, we mean that in the material of formula (I) includes a unit in which an oxygen atom which is coordinated to a tungsten atom in the crystal structure is also coordinated to a phosphorus atom, and this phosphorus atom is bonded either directly or via an oxygen atom to an optionally substituted hydrocarbyl group R.

According to a second aspect of the present invention there is provided a method of preparing a material of formula (I)

$$M^1_a M^2_b W_c O_d (P(O)_n R_m)_e \quad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group; the method comprising the steps of:
  (i) admixing:
    (a) a source of dopant species $M^1$ and optionally $M^2$;
    (b) a source of tungsten;
  (ii) adding (c) an organophosphorus compound; and
  (iii) heating a mixture of (a), (b) and optionally (c) in a reducing atmosphere.

Step (i) of the second aspect of the invention involves admixing a source of dopant species $M^1/M^2$ (a) and a source of tungsten (b).

When metals $M^1$ and $M^2$ are both used these may be each provided from the same source or a different source. Thus in some embodiments component (a) may comprise a mixture of compounds.

Step (ii) involves adding an organophosphorus compound (c).

In some embodiments steps (i) and (ii) may be combined and the method of the second aspect may involve admixing components (a), (b) and (c).

In some embodiments steps (i) and (ii) may be carried out separately and the source of dopant species $M^1/M^2$ (a) and source of tungsten (b) are admixed first and then further mixed with an organic phosphorus compound (c) before or after being heated in a reducing atmosphere.

In some embodiments step (ii) is carried out before step (iii) and step (iii) involves heating a mixture of a source of dopant species $M^1/M^2$ (a); a source of tungsten (b) and an organophosphorus compound (c) in a reducing atmosphere.

In some embodiments step (iii) is carried out before step (ii). In such embodiments step (iii) involves heating a mixture of a source of dopant species $M^1/M^2$ (a) and a source of tungsten (b) in a reducing atmosphere and step (ii) involves adding an organophosphorus compound (c) to this reduced mixture.

Suitably the source of dopant species $M^1/M^2$ comprises a salt comprising a cationic species $M^1/M^2$ and an anion. Suitable salts include halides, nitrites, nitrates, sulfates, hydroxides, carbonates and oxides. Preferably the source of dopant species $M^1/M^2$ is a carbonate, hydroxide or nitrate.

In preferred embodiments when $M^1$ is caesium, the source of dopant species $M^1$ will suitably be a caesium source. Preferred caesium sources include caesium carbonate, caesium hydroxide, and caesium nitrate.

In some embodiments component (a) may comprise a mixture of two or more sources of dopant species $M^1/M^2$. In such embodiments component (a) may comprise a mixture of two or more different salts of the same species $M^1/M^2$ and/or salts comprising different species $M^1/M^2$.

Any compound comprising tungsten may be used as the source of tungsten (b). Preferred sources of tungsten include sodium tungstate, tungstic acid and ammonium metatungstate.

Component (b) may comprises a mixture of two or more sources of tungsten.

The ratio of component (a) and component (b) used in step (i) is determined by the desired molar ratio in the material of formula (I).

Typically the molar ratio of dopant species $M^1/M^2$ to tungsten is from 1:2 to 1:4, preferably approximately 1:3. The selection of an appropriate ratio of starting materials is within the competence of the person skilled in the art.

In preferred embodiments step (i) is carried out in a solvent. Preferred solvents include water, water miscible alcohols, and mixtures thereof. Especially preferred solvents are water, methanol, ethanol, propanol, isopropanol, butanol and mixtures thereof.

In preferred embodiments in which steps (i) and (ii) are carried out simultaneously, this combined step is preferably carried out in the presence of such a solvent.

Step (ii) involves the addition of (c) an organophosphorus compound.

Any organophosphorus compound can be used. By organophosphorus compound we mean a compound which includes a phosphorus atom and a hydrocarbyl group in which a carbon atom is bonded either directly or via an oxygen atom to the phosphorus atom.

Suitable organophosphorus compounds include hydrocarbyl phosphines, phosphate and phosphonate esters.

Preferred organophosphorus compounds are compounds of formula (II):

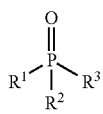
(II)

in which each of $R^1$, $R^2$ and $R^3$ is independently selected from OH, H, $OR^4$, alkyl, aryl and $(OR^5)_n OH$; wherein $R^4$ is alkyl or aryl; each $R^5$ is independently ethyl or propyl; and n is at least 1.

Preferably each of $R^1$, $R^2$ and $R^3$ is independently selected from OH, $OR^4$, alkyl and aryl.

Preferably $R^1$ is OH, $R^2$ is OH and $R^3$ is a group R as defined in relation to the first aspect.

Most preferably $R^1$ is OH, $R^2$ is OH and $R^3$ is selected from $C_8H_{17}$, $C_{18}H_{37}$ and phenyl.

Preferred organophosphorus compounds for use herein include octyl phosphonic acid, methylphosphonic acid dimethylester, tristearylphosphate, phenyl phosphate and triphenyl phosphate and polyethylene glycol monooleyl ether phosphate.

In one embodiment the source of dopant species $M^1/M^2$ (a) and the source of tungsten (b) are pre-mixed in step (i) and the source of organophosphorus (b) is added to this mixture in step (ii).

Step (i) may be carried out at ambient temperature or at elevated temperatures. In some embodiments step (i) may be carried out at temperatures above 50° C., for example 60° C. or 70° C. In some embodiments step (i) may be carried out at 80° C.

In embodiments in which step (ii) is carried out before step (iii) it may be carried out at ambient temperature or at elevated temperatures. In some embodiments step (ii) may be carried out at temperatures above 50° C., for example 60° C. or 70° C. In some embodiments step (ii) may be carried out at 80° C.

Steps (i) and/or (ii) suitably involve agitation the mixture formed.

Preferably any solvent is removed prior to step (iii). Preferably there is a step of drying the material before step (iii). Suitable methods of drying will be known to the person skilled in the art and include, for example, the use of a spray drier.

Step (iii) involves heating a mixture of (a), (b) and optionally (c) in a reducing atmosphere.

Suitably step (iii) involves heating a mixture of (a), (b) and optionally (c) in a reducing atmosphere at temperatures in excess of 300° C., suitably in excess of 400° C., preferably in excess of 450° C., for example at temperatures of 500 to 600° C.

Step (iii) suitably involves heating a mixture of (a), (b) and optionally (c) in a gaseous environment comprising hydrogen, nitrogen, carbon monoxide or mixture thereof. In preferred embodiments step (iii) involves heating a mixture of (a), (b) and optionally (c) in a nitrogen/hydrogen atmosphere.

In preferred embodiments step (iii) is carried out after step (ii) and involves heating a mixture comprising a source of dopant species $M^1/M^2$ (a), a source of tungsten (b) and an organophosphorus compound (c).

In some embodiments step (iii) is carried out before step (ii) and involves heating a mixture comprising a source of dopant species $M^1/M^2$ (a) and a source of tungsten (b). In such embodiments the reduced mixture is then admixed with an organophosphorus compound (c).

The reduced mixture obtained after step (iii) is suitably mixed with an organophosphorus compound (c) in the presence of a solvent in step (ii). Preferred solvents include water, water miscible alcohols (especially methanol and ethanol), and mixtures thereof.

After step (ii) the product is suitably dried. In such embodiments the product may be optionally heated again in a reducing atmosphere. Preferred conditions are as described in relation to step (iii).

Embodiments in which step (iii) is carried out before step (ii) allow only low amounts of organophosphorus to be incorporated, whereas embodiments in which step (iii) is carried out after step (ii) allow an almost free variation of the W/P ratio in the final product.

The material obtained after step (iii) may be used directly or subjected to further treatment.

In some preferred embodiments the method of the second aspect may involve a further step (iv) of milling the material obtained in step (iii).

Preferred milling processes involve ball milling.

Suitably milling is carried out until a specific surface area/particle size is obtained.

In preferred embodiments the material is ball milled until a surface area of at least 20 m²/gram is obtained.

Suitably the method of the second aspect of the present invention can be used to directly provide nanoparticles. Nanoparticles are suitably particles which have one or more dimensions of the order of 100 nm or less. Particle size may be measured by any suitable method. For example, any of the methods described in PAS 71:2005 published by British Standards could be used. Preferred methods for the determination of particle size include TEM (Transmission Electron Microscopy, when particles are made of a material that has high contrast with a carbon TEM grid), SEM (Scanning Electron Microscopy) and AFM (Atomic Force Microscopy). If the particles show plasmon resonance then the size can also be determined from the peak in the UV-VIS spectrum. For larger particles having a size of order of magnitude of $10^{-8}$ m or greater, light scattering can be used.

Suitably the method of the second aspect of the present invention provides particles having an average particle size of less than 100 nm, preferably less than 50 nm. Average particle size may be determined by SEM or laser diffraction and is within the competence of the person skilled in the art.

Figure 1:
FIG. 1 shows photographs of test plates used in Example 8, described below.
Figure 1:
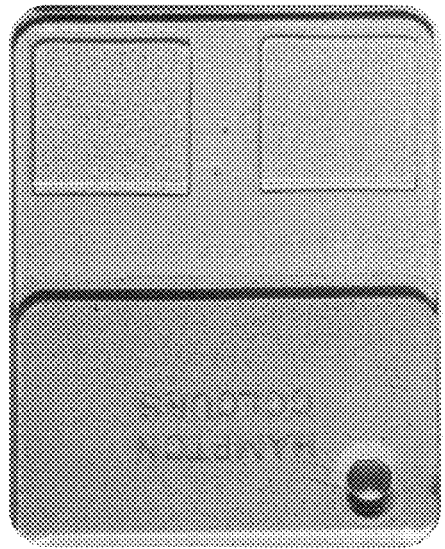
Figure 1:
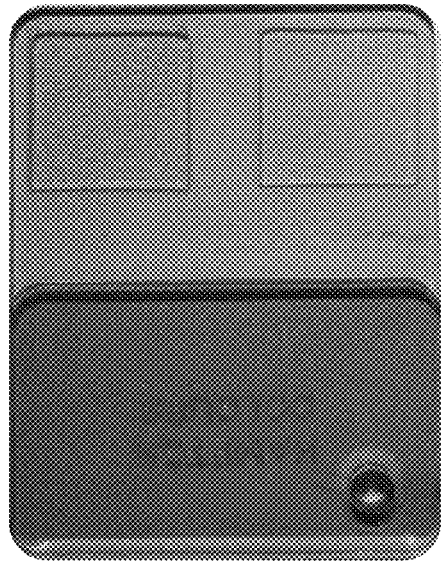

It is believed that the present invention provides materials of formula (I) in which organophosphorus moieties are incorporated into the crystal structure of the tungsten oxide.

It is well known that tungsten oxides with a hexagonal or cubic or triclinic crystal structure are preferred for NIR absorbing material. In most cases the hexagonal structure seems to create the most efficient absorbing structure. The structure consists of tungsten-oxygen hexagonal lattice, which creates channels.

For stabilization of the structure the dopant metals are included. The dopant metals are enclosed in the channels. The ionic radius of the dopant metal is responsible for the degree of loading. For caesium as dopant metal the most widely described ratio between tungsten/caesium ratio is 3:1.

Without being bound by theory, based on solid state P-NMR evidence, it is believed that in the materials of formula (I), the organophosphorus moiety is incorporated onto and into the tungsten oxide lattice.

Incorporation of an organophosphorus compound onto or into the crystal lattice has also the effect that the particle size can be reduced and the degree of agglomeration is drastically reduced.

Compounds of formula (I) have been found to overcome problems relating dispersability and agglomeration that occur when using solid powders. Without being bound by theory, it is believed that the existence of a W—O—P—R or W—O—P—OR bond provides a more stable, readily deagglomeratable product. It can also believed that in the case where the oxidation state of phosphorus is +3, there is a beneficial effect on the oxidation stability of $W^{5+}$.

The compounds of formula (I) therefore find considerable utility in a wide variety of applications.

According to a third aspect of the present invention there is provided a composition comprising a material of formula (I)

$$M^1_a M^2_b W_c O_d (P(O)_n R_m)_e \quad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group; and one or more further components.

The composition of the third aspect comprises the material of formula (I) and one or more further components. The nature of the one or more further components will depend on the intended use of the material.

In some embodiments the composition of the third aspect comprises a polymer precursor composition. In such embodiments the composition suitably comprises a material of formula (I), and one or more monomers.

In such compositions the material of formula (I) is suitably present in an amount of from 0.001 to 10 wt %, preferably from 0.01 to 0.25 wt %.

In some preferred embodiments the polymer precursor composition does not comprise a solvent.

In some embodiments the polymer precursor composition further comprises a solvent.

Suitable solvents will depend on which monomers are present. Preferred solvents include water, alcohols (including glycols, ketones (for example methyl ethyl ketone (MEK) and methyl isobutyl ketone (MIBK)), aromatic solvents (for example toluene) and aliphatic hydrocarbon solvents.

The nature of the monomer will depend on the desired polymer that will be prepared by the composition. In some preferred embodiments the monomer comprises an ester and the polymer produced is selected from polycarbonate, polyethyleneterephthalate, polybutylenterephthalate, and acrylate or methacrylate polymers or copolymers.

Other suitable monomers include vinyl and vinyl derived monomers, for example vinyl butyral.

Such polymer precursor compositions may comprise one or more further optional components. These are suitably selected from initiators, dispersants, stabilisers, UV-stabilisers, catalysts, flame retardants and other functional materials.

The material of formula (I) is suitably included in the composition of the third aspect, for example a polymer precursor composition as nanoparticles. Thus the third aspect of the present invention preferably provides a composition comprising nanoparticles of a material of formula (I) and one or more further components.

In some embodiments the composition of the third aspect may comprise a polymer. Thus the present invention may further provide a polymer having dispersed therein particles of a material of formula (I). Suitably the invention provides a polymer having dispersed therein nanoparticles of a material of formula (I).

A particular advantage of the material of the present invention is that it will suitably disperse into nanoparticles by regular production processes. No extra formulated dispersions, masterbatches or other intermediates are necessary to achieve a high performing NIR absorbing effect.

According to a fourth aspect of the present invention there is provided a method of preparing a composition of the third aspect the method comprising combining a material of formula (I)

$$M^1{}_aM^2{}_bW_cO_d(P(O)_nR_m)_e \quad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group; with one or more further components.

In the method of the fourth aspect the material of formula (I) may be directly admixed in neat solid form with the one or more further components. The material of formula (I) can, for example, be directly mixed into a polymer precursor composition without the need for a diluent or carrier. Suitably nanoparticles can be directly incorporated into a composition.

Thus the fourth aspect of the present invention may involve directly admixing solid nanoparticles of a material of formula (I) with one or more further components.

The method of the present invention may further provide a method of preparing a polymer having dispersed therein particles, preferably nanoparticles, of a material of formula (I).

In some embodiments the method may comprise admixing particles, preferably nanoparticles, of a material of formula (I) with a polymer precursor composition comprising one or more monomers and then polymerising the monomers.

In such embodiments polymerisation may, for example, be carried out by condensation reactions or by UV induced polymerisation. The selection of an appropriate technique depending on the monomers involved will be within the competence of the skilled person.

In some embodiments the material of formula (I) may be mixed directly with polymers in an extrusion machine to make a masterbatch. In some embodiments the material of formula (I) may be mixed with the polymer to be used for injection moulding process to directly produce a transparent sheet, film, plate or other workpiece. Suitably no further treatment or particle size reduction processes are necessary.

A particular advantage of the present invention compared with processes of the prior art is that materials of the prior art have to be added to a polymer melt or monomer containing polymer precursor composition in the form of a paste or dispersion. This is not necessary in the case of the present invention in which the material of formula (I) can be directly added in particulate form and is self dispersing within a polymer film.

Thus the present invention may provide a method of preparing a polymer film having dispersed therein particles (especially nanoparticles) of a material of formula (I), the method comprising directly adding solid particles (especially nanoparticles) of a material of formula (I) into a polymer or polymer precursor composition. Suitably the particles (especially nanoparticles) of a material of formula (I) are not mixed with any other components (such as a diluent or carrier) prior to admixture with the polymer or polymer precursor composition.

According to a fifth aspect of the present invention there is provided the use of a material of formula (I)

$$M^1{}_aM^2{}_bW_cO_d(P(O)_nR_m)_e \quad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group; as an infrared absorbing material.

The fifth aspect of the present invention relates to the use of the material of formula (I) to absorb infrared radiation. Preferably the use relates to the absorption in the near infrared region. Preferably the material absorbs light of at least one wavelength in the region from 780 nm to 2500 nm.

Preferably the material strongly absorbs light in the region from 780 nm to 2500 nm. Preferably the material transmits light in the region from 400 to 780 nm.

According to the fifth aspect the material of formula (I) can be used to absorb infrared radiation in a wide variety of applications.

In one embodiment the material of formula (I) may be used in films for protection against solar radiation for domestic windows or automotive glazing.

The material of formula (I) may be used in coatings, powder coatings, inks and in polymers for laser marking.

In one embodiment the material of formula (I) can be used as a spectral selective taggant for security printing and for anti-counterfeiting measures.

The material of formula (I) may be used in injection moulded parts.

In some preferred embodiments the fifth aspect involves the use of the material of formula (I) as an infrared absorbing material in a polymer film, especially a polymer film on a window.

According to a sixth aspect of the present invention there is provided a polymer film comprising particles of a material of formula (I)

$$M^1{}_aM^2{}_bW_cO_d(P(O)_nR_m)_e \quad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

Suitably the sixth aspect of the present invention provides a polymer film having dispersed therein nanoparticles of a material of formula (I).

Preferably the polymer film absorbs infrared radiation and transmits visible radiation.

According to a seventh aspect of the present invention there is provided a window that is at least partially covered by a composition comprising particles of a material of formula (I)

$$M^1{}_aM^2{}_bW_cO_d(P(O)_nR_m)_e \quad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

In one embodiment the material of formula (I) is present in a film on the surface of the window.

In one embodiment the material of formula (I) is present in an organic or sol-gel coating on the surface of the window.

In another embodiment the material of formula (I) is present in a polymer film sandwiched between two glass panes. Suitably the window may be used as an automotive front window or as security glass.

The invention may further provide a building or a vehicle comprising a window of the seventh aspect.

Any feature of any aspect of the present invention may be combined with any feature of any other aspect of the invention as appropriate. In particular the material of formula (I) in the second, third, fourth, fifth, sixth, seventh and further aspects is as defined in relation to the first aspect.

The invention will now be further described with reference to the following non-limiting examples.

EXAMPLE 1

A clean reactor is filled with 100 kg DI-water and 18 kg caesium carbonate are dissolved with stirring. After the dissolution 82 kg of ammonium metatungstate are added with stirring at room temperature. Finally 45 kg of diphenylphosphate are added with stirring. Stirring is continued for 3 hours. After 3 hours the solution has turned turbid and the resulting slurry is dried with a spray drier. The resulting powder is transferred into saggars and is heated in an electric kiln under a nitrogen/hydrogen atmosphere at 600° C. for 2 hours. The resulting deep blue powder is dispersed in 200 l of DI water and ball milled until a surface area of at least 20 $m^2/gr$ is reached.

The resulting dispersion is spray dried again and results in 86 kg of blue powder.

EXAMPLE 2

A clean reactor is filled with 100 kg DI-water and 18 kg caesium carbonate are dissolved with stirring. After the dissolution 82 kg of ammoniummetatungstate are added with stirring at room temperature. Finally 22 kg of phenylphosphonic acid are added with stirring. Stirring is continued for 3 hours. After 3 hours the solution has turned turbid and the resulting slurry is dried with a spray drier. The resulting powder is transferred into saggars and is heated in an electric kiln under a nitrogen/hydrogen atmosphere at 600° C. for 2 hours. The resulting deep blue powder is dispersed in 200 l of DI water and ball milled until a surface area of at least 20 $m^2/gr$ is reached.

The resulting dispersion is spray dried again and results in 80 kg of blue powder.

EXAMPLE 3

A clean reactor is filled with 100 kg DI-water and 18 kg caesium carbonate are dissolved with stirring. After the dissolution 82 kg of ammoniummetatungstate are added with stirring at room temperature. Finally 35 kg of methylphosphonic acid dimethylester, dissolved in methanol are added with stirring. Stirring is continued for 3 hours. After 3 hours the solution has turned turbid and the resulting slurry is dried with a spray drier. The resulting powder is transferred into saggars and is heated in an electric kiln under a nitrogen/hydrogen atmosphere at 600° C. for 2 hours. The resulting deep blue powder is dispersed in 200 l of DI water and ball milled until a surface area of at least 20 $m^2/gr$ is reached.

The resulting dispersion is spray dried again and results in 80 kg of blue powder.

EXAMPLE 4

A clean reactor is filled with 100 kg DI-water and 18 kg caesium carbonate are dissolved with stirring. After the dissolution 82 kg of ammonium metatungstate are added with stirring at room temperature. Finally 30 kg of 85% octylphosphonic acid dissolved in an water/ethanol mixture are added with stirring. Stirring is continued for 3 hours. After 3 hours the solution has turned turbid and the resulting slurry is dried with a spray drier. The resulting powder is transferred into saggars and is heated in an electric kiln under a nitrogen/hydrogen atmosphere at 600° C. for 2 hours. The resulting deep blue powder is dispersed in 200 l of DI water and ball milled until a surface area of at least 20 $m^2/gr$ is reached.

The resulting dispersion is spray dried again and results in 85 kg of blue powder.

EXAMPLE 5

A clean reactor is filled with 150 kg DI-water and 82 kg of tungstic acid are added with stirring at room temperature. 22 kg of caesium carbonate are added with stirring. Stirring is continued for 3 hours at elevated temperatures of 80° C. The turbid dispersion is filtered and the filter cake is dried at 105° C. for 16 hours. After cooling to room temperature the yellow orange powder is dispersed in water again and 26 kg of phenylphosphonic acid are added and the mixture is continued to be stirred another 5 hours. The dispersion is filtered again, the filter cake dried again at 105° C. for 16 hours. The dry filter cake is crushed and heated in an electric kiln under a nitrogen/hydrogen atmosphere at 500° C. for 4 hours. The resulting deep blue powder is dispersed in 200 l of DI water and ball milled until a surface area of at least 20 $m^2/gr$ is reached.

The resulting dispersion is spray dried and results in 98 kg of blue powder.

EXAMPLE 6

A clean reactor is filled with 150 kg DI-water and 82 kg of tungstic acid are added with stirring at room temperature. 22 kg of caesium hydroxide are added with stirring. Stirring is continued for 3 hours at elevated temperatures of 80° C. The turbid dispersion is filtered and the filter cake is dried at 105° C. for 16 hours. After cooling to room temperature the yellow orange powder is dispersed in water again and 30 kg of octylphosphonic acid in a water/ethanol mix are added and the mixture is continued to be stirred another 5 hours. The dispersion is filtered again, the filter cake dried again at 105° C. for 16 hours. The dry filter cake is crushed and heated in an electric kiln under a nitrogen/hydrogen atmosphere at 500° C. for 4 hours. The resulting deep blue powder is dispersed in 200 l of DI water and ball milled until a surface area of at least 20 $m^2/gr$ is reached.

The resulting dispersion is spray dried and results in 98 kg of blue powder.

EXAMPLE 7

A clean reactor is filled with 150 kg DI-water and 82 kg of tungstic acid are added with stirring at room temperature. 22 kg of caesium hydroxide are added with stirring. Stirring is continued for 3 hours at elevated temperatures of 80° C. The turbid dispersion is filtered and the filter cake is dried at 105° C. for 16 hours. After cooling to room temperature the yellow orange powder is dispersed in water again and 54 kg of distearylphosphate in ethanol are added and the mixture is continued to be stirred another 5 hours. The dispersion is filtered again, the filter cake dried again at 105° C. for 16 hours. The dry filter cake is crushed and heated in an electric kiln under a nitrogen/hydrogen atmosphere at 500° C. for 4 hours. The resulting deep blue powder is dispersed in 200 l of DI water and ball milled until a surface area of at least 20 $m^2/gr$ is reached.

The resulting dispersion is spray dried and results in 98 kg of blue powder.

EXAMPLE 8

The inventive organophosphorus tungsten oxide of example 4 and a regular caesium tungstate powder compound were each mixed with polycarbonate in a dry blender and test plates were injection moulded under usual conditions. The level of each tungsten compound was 0.05 wt % in the polymer. No other additives were added.

A photograph of the test plates is provided in FIG. 1. The untreated test plates (A) were colourless. The visual inspection of the test plates showed that the test plates made with the regular caesium tungstate powder (B) were largely colourless, containing little black spots of undispersed material. The test plates made with the inventive tungsten composite material of example 4 (C) were a light green colour.

EXAMPLE 9

Figure 2:
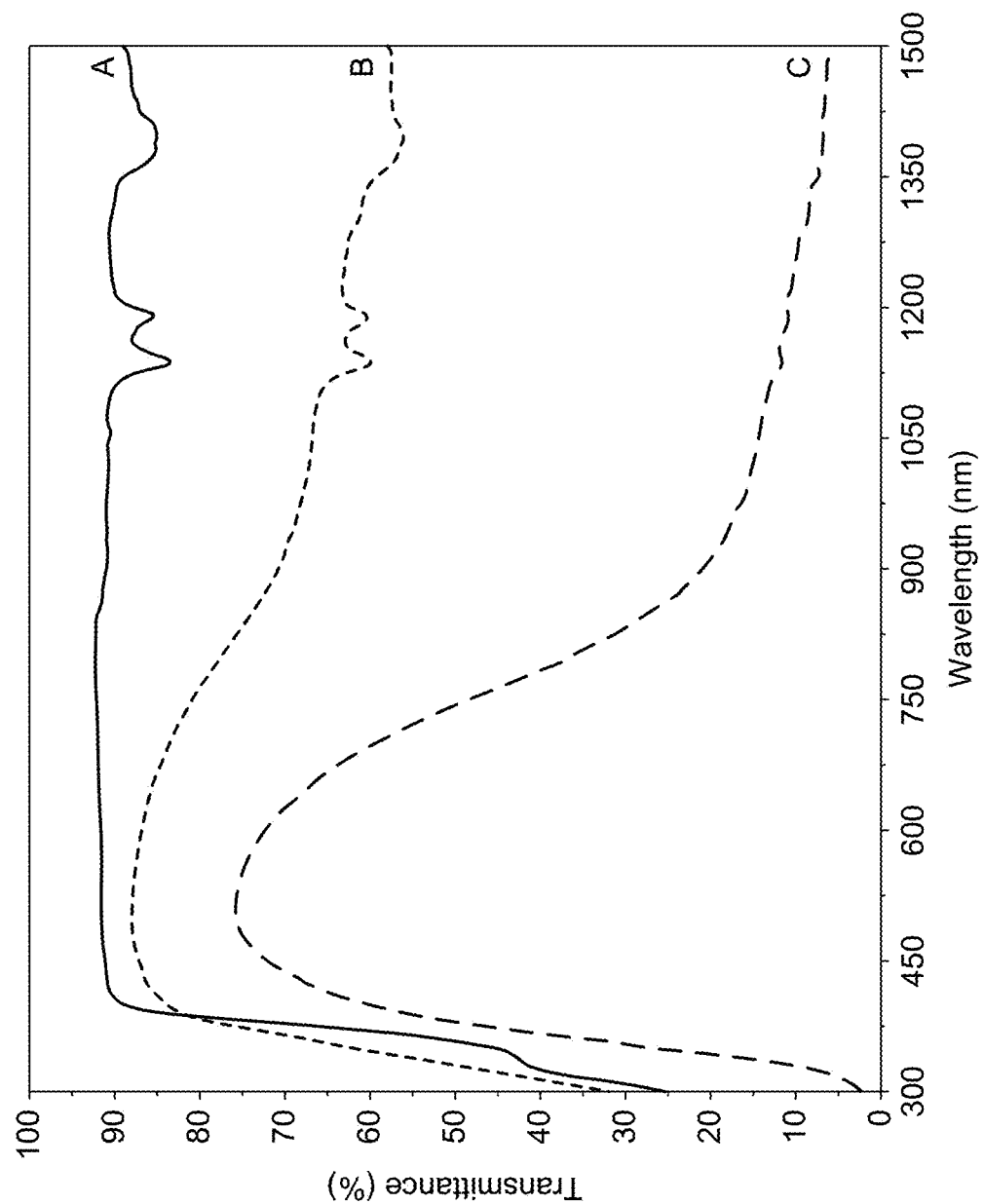
FIG. 2 shows the visible and infrared transmittance spectra of the plates used in Example 8.
Figure 3:
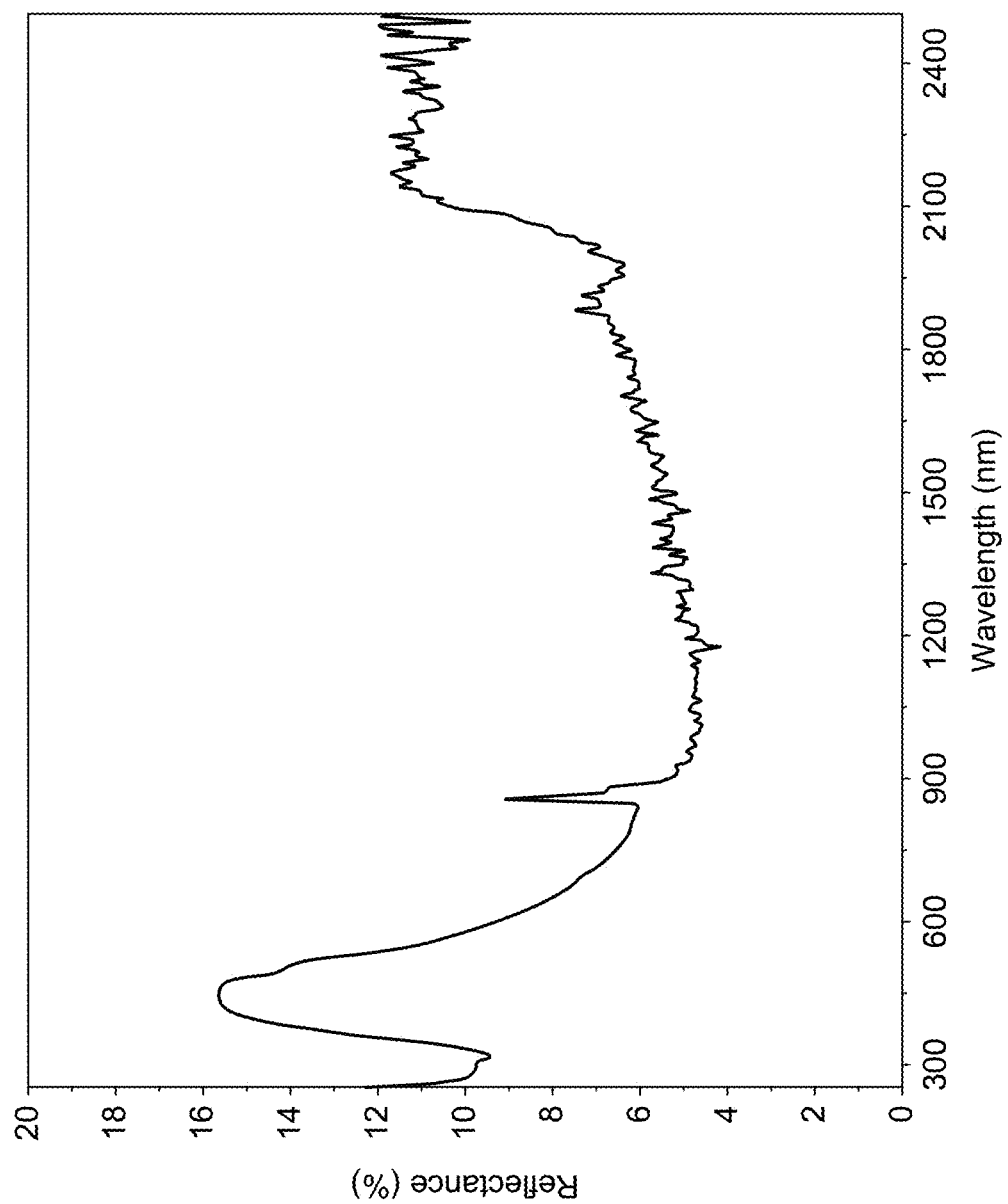
FIG. 3 shows powder reflectance of the material of Example 4, described below.

The visible and infrared transmittance spectra of the polycarbonate plates of example 8 were recorded. The results are shown in FIG. 2. Trace A is for a standard plate; trace B is for the plate with regular CWO; and trace C is for the plate having dispersed therein the material of example 4. The NIR analysis shows a very good result of the material of the invention: high transparency in the visible range, but much higher absorption in the 750-1200 nm range when compared with the non inventive CWO. FIG. 3 clearly shows that all plates transmit visible light at reasonable levels, but only the plate comprising the material of example 4 has a high absorption of infrared light.

EXAMPLE 10

The powder reflectance of the material of example 4 was recorded and is shown in FIG. 3. This spectrum shows that there is very little reflection in the range of 900-1800 nm, which means that there is a high absorption since there is no transmission in a powder sample.

EXAMPLE 11

Figure 4:
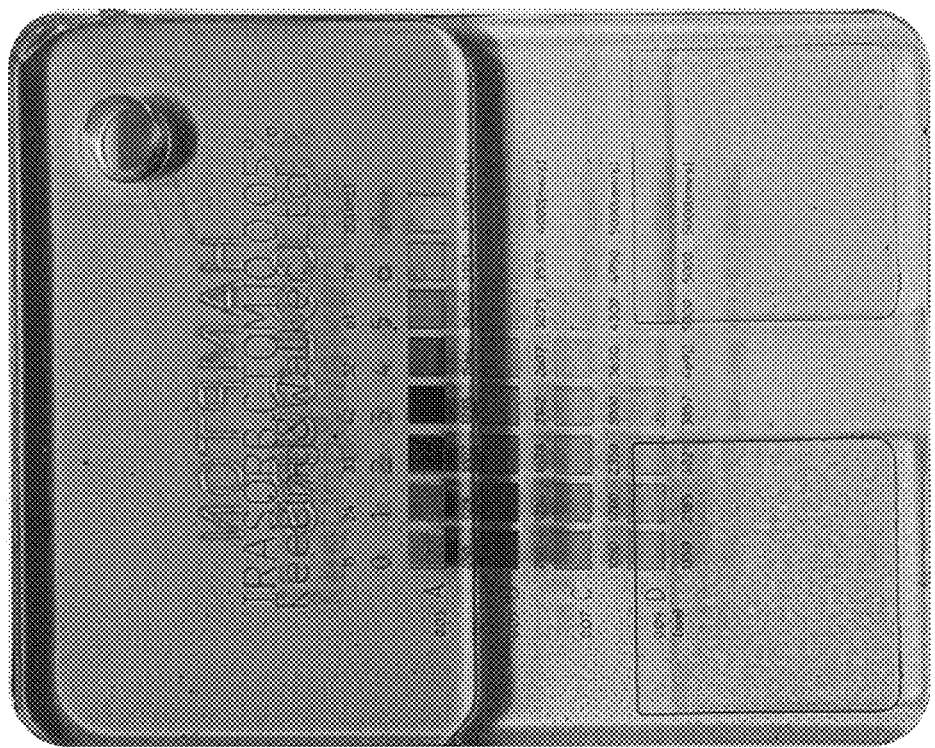
FIG. 4 shows photographs of lasermarked plates of Example 8.
Figure 4:
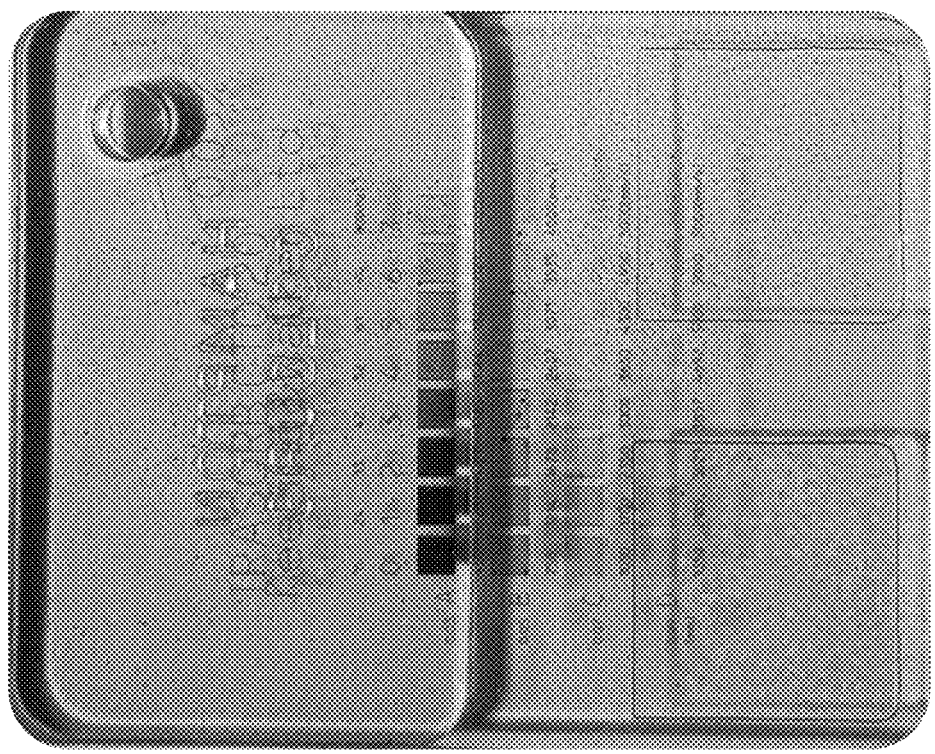

The test plates generated in Example 8 were Lasermarked with a 1064 nm Laser and analysed. Pictures of the lasermarked plates are shown in FIG. 4. FIG. B1 shows the lasermarked plates with conventional CWO and FIG. B2 shows the Lasermarked plates of the inventive material of example 4.

The Lasermarking was done by exposing the test plates by a variation of the Laser Frequency versus the Line Displacement speed. The plates with the conventional CWO showed inhomogenous product distribution visible by the black spots. Due to the insufficient distribution only reasonable Laser Marking results were achieved with low line displacement speeds. At higher speeds no good results were obtained even at 1% content.

Plates containing the inventive material did not show any black spots indicating poor product distribution and showed better Laserresponse at a higher range of frequencies and line displacement speeds, which is visible by the increased number of coloured test field markings on the plates.

These results demonstrate that the organophosphorus modified tungsten oxide of the invention shows a higher degree of dispersion in the polymer than the CWO of the prior art.

EXAMPLE 12

As a further test the organophosphorus tungsten oxide compound of example 4 was incorporated into a printing ink and the effect on the infrared ray absorption tested.

Again state of the art CWO powder and the inventive organophosphorus tungsten oxide compound were blended at different levels into a non absorbing white base ink with the help of a speedmixer. The ready to use inks were applied via an orange proofer onto paper and polymer films.

Figure 5:
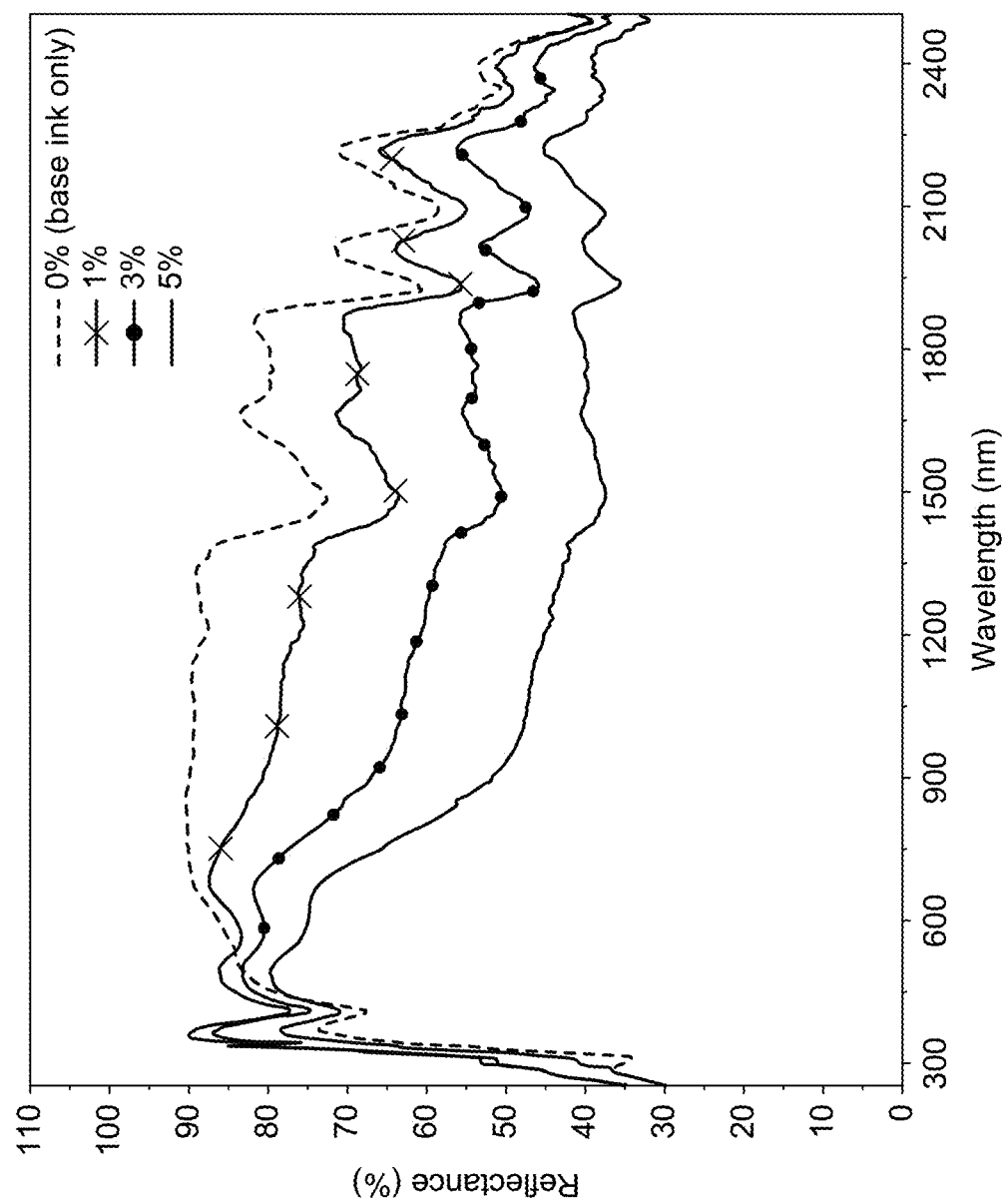
FIG. 5 shows the spectra for ink comprising material of the prior art.
Figure 6:
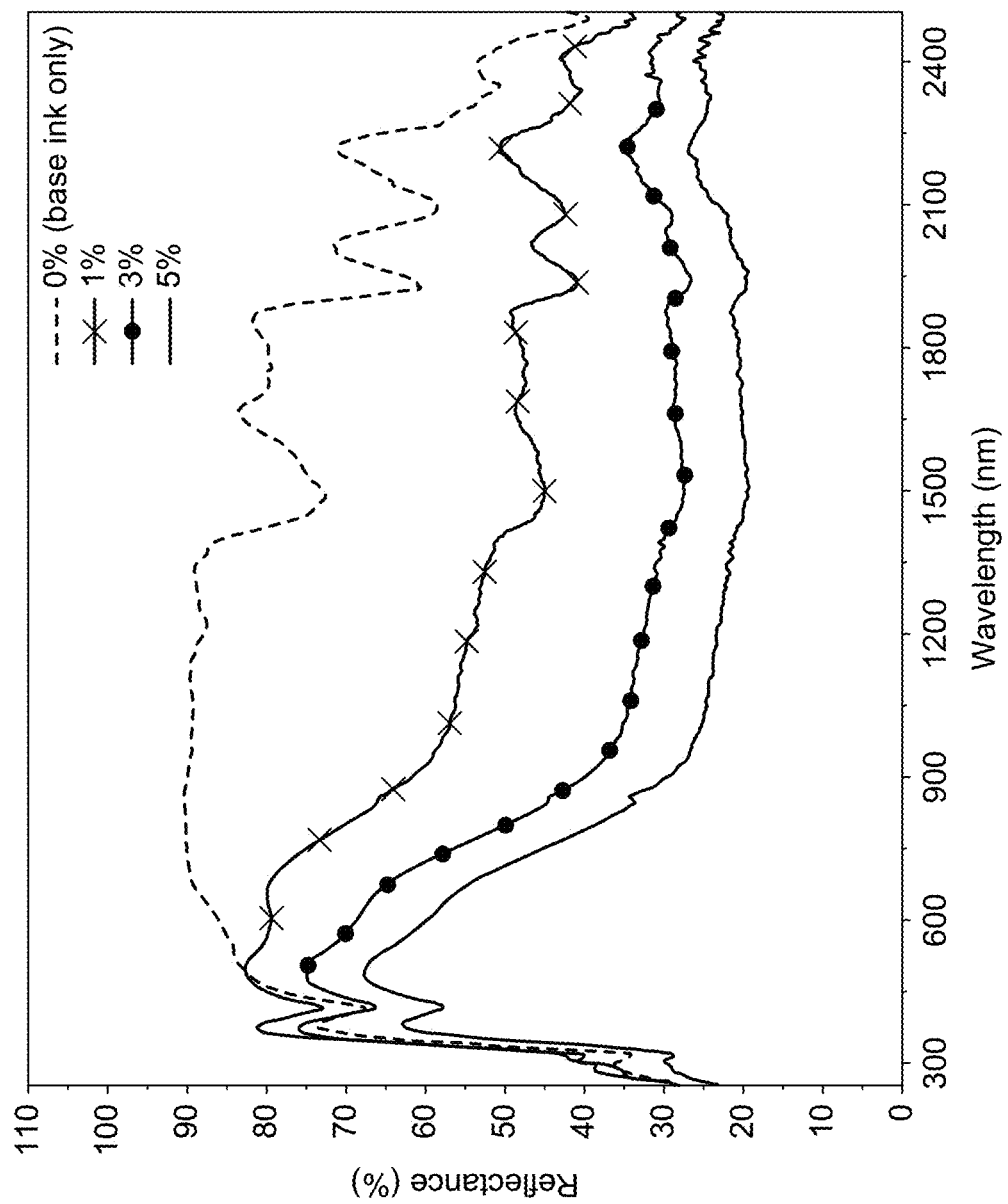
FIG. 6 shows the spectra for ink comprising material according to an embodiment of the invention.

The prints were dried and spectroscopically analysed. FIG. 5 shows the spectra for the ink comprising the material of the prior art. FIG. 6 shows the spectra for the ink comprising the inventive material.

It can be clearly seen that the organophosphorus tungsten oxide compound has a higher NIR absorption capability than the state of the art CWO powder. For example at 900 nm 5% CWO in the printing ink resulted in an absorption of 60%, whereas the same amount of organophosphorus tungsten composite resulted in a 75% absorption rate. At lower concentration rates the increase in NIR absorption is even bigger.

The spectra confirm that the organophosphorus tungsten oxide compound has a much better dispersability in the films and lead to a higher NIR absorption compared to state of the art materials.

EXAMPLE 13

Figure 7:
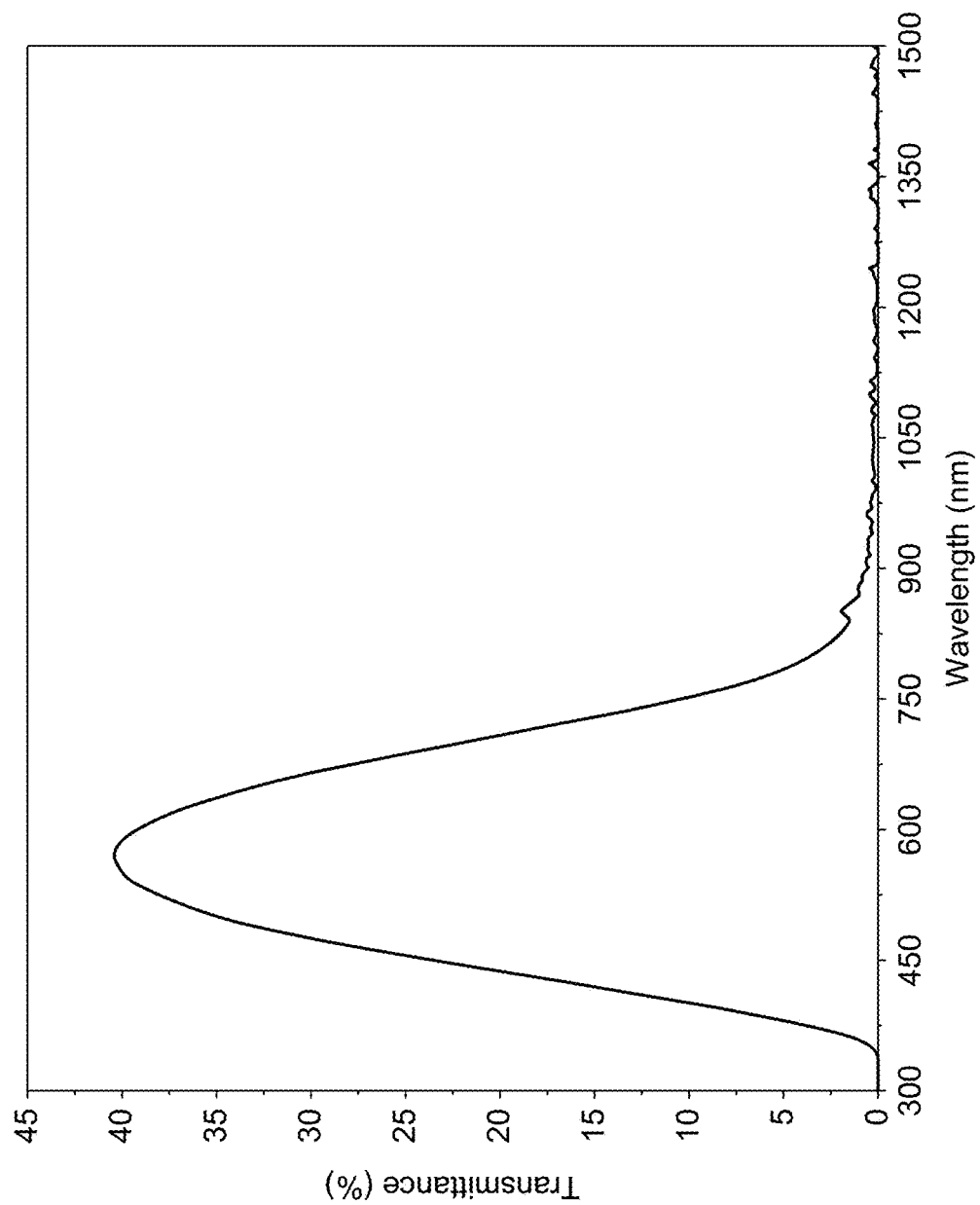
FIG. 7 shows the visible and infrared transmittance spectrum of a compound according to Example 7, described below.

The organophosphorus tungsten oxide compound of example 7 was dispersed in an organic aliphatic solvent at a concentration of 1 wt %. The visible and infrared transmittance spectrum of this dispersion is shown in FIG. 7.

The invention claimed is:

1. A method of preparing a material of formula (I)

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group; the method comprising the steps of:
(i) admixing:
  (a) a source of dopant species $M^1$;
  (b) a source of tungsten;
(ii) adding (c) an organophosphorus compound; and
(iii) heating a mixture of (a) and (b) in a reducing atmosphere.

2. The method of claim 1, wherein (a) further includes a source of dopant species $M^2$.

3. The method of claim 1, wherein the heating further includes heating (c) in the reducing atmosphere.

4. A polymer precursor composition comprising:
a material of formula (I)

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group; and
one or more monomers.

5. A composition according to claim 4 comprising a polymer having dispersed therein nanoparticles of a material of formula (I)

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

6. A method of preparing a polymer precursor composition according to claim 4, the method comprising combining a material of formula (I) with the one or more monomers.

7. The method according to claim 6 which involves directly admixing neat solid particles of a material of formula (I) with the one or more monomers.

8. A method of lasermarking using a coating, powder coating, ink, or polymer containing an infrared absorbing material including the polymer precursor composition of claim 4.

9. A polymer film for protection against solar radiation for domestic windows or automotive glazing comprising particles of a material of formula (I)

$$M^1{}_a M^2{}_b W_c O_d (P(O)_n R_m)_e \qquad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

10. A window that is at least partially covered by a composition comprising particles of a material of formula (I)

$$M^1{}_a M^2{}_b W_c O_d (P(O)_n R_m)_e \qquad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

11. The window according to claim 10 wherein the material of formula (I) is present in a film on the surface of the window.

12. The window according to claim 10 wherein the material of formula (I) is present in an organic or sol-gel coating on the surface of the window.

13. The window according to claim 10 wherein the material of formula (I) is present in a polymer film sandwiched between two glass panes.

14. A method of directly producing a transparent sheet, film, plate or other workpiece comprising admixing a material of formula (I) with a polymer in an injection moulding process $$M^1{}_a M^2{}_b W_c O_d (P(O)_n R_m)_e \qquad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

* * * * *